United States Patent
Crook et al.

(10) Patent No.: US 9,947,343 B1
(45) Date of Patent: Apr. 17, 2018

(54) HARD DISK DRIVE DESLEDDER

(71) Applicant: Amazon Technologies, Inc., Reno, NV (US)

(72) Inventors: Ian Michael Crook, Reston, VA (US); Christopher Wayne Turner, Leesburg, VA (US)

(73) Assignee: Amazon Technologies, Inc., Seattle, WA (US)

( * ) Notice: Subject to any disclaimer, the term of this patent is extended or adjusted under 35 U.S.C. 154(b) by 688 days.

(21) Appl. No.: 14/318,969

(22) Filed: Jun. 30, 2014

(51) Int. Cl.
| | |
|---|---|
| *G11B 5/024* | (2006.01) |
| *B02C 18/04* | (2006.01) |
| *B02C 18/02* | (2006.01) |
| *B23D 15/06* | (2006.01) |
| *B23D 31/00* | (2006.01) |

(52) U.S. Cl.
CPC .............. *G11B 5/024* (2013.01); *B02C 18/02* (2013.01); *B02C 18/04* (2013.01); *B23D 15/06* (2013.01); *B23D 31/00* (2013.01); *Y10T 29/53274* (2015.01)

(58) Field of Classification Search
CPC ... G11B 5/024; Y10T 29/53274; B23D 15/06; B23D 31/00
See application file for complete search history.

(56) References Cited

U.S. PATENT DOCUMENTS

| | | | |
|---|---|---|---|
| 6,304,439 B1 | 10/2001 | Anderson | |
| 8,251,303 B2 | 8/2012 | Wozny | |
| 8,887,605 B2 * | 11/2014 | van Gemert | ............ B02C 18/02 83/382 |
| 2012/0091237 A1 | 4/2012 | Clark et al. | |

* cited by examiner

*Primary Examiner* — A. Dexter Tugbang
*Assistant Examiner* — Jeffrey T Carley
(74) *Attorney, Agent, or Firm* — Klarquist Sparkman, LLP

(57) ABSTRACT

A hard disk drive desledder comprises a support and a cutting member. The support is configured to receive and to support a hard disk drive assembly that includes a hard disk drive and a sled. The cutting member has at least two cutting edges corresponding to respective portions of the sled. The cutting member is movable from a first position spaced apart from the support and a second position adjacent the support to cause the at least two cutting edges to cut portions of the sled to allow the hard disk drive to be removed from the hard disk drive assembly. Related desledding methods are also described.

11 Claims, 4 Drawing Sheets

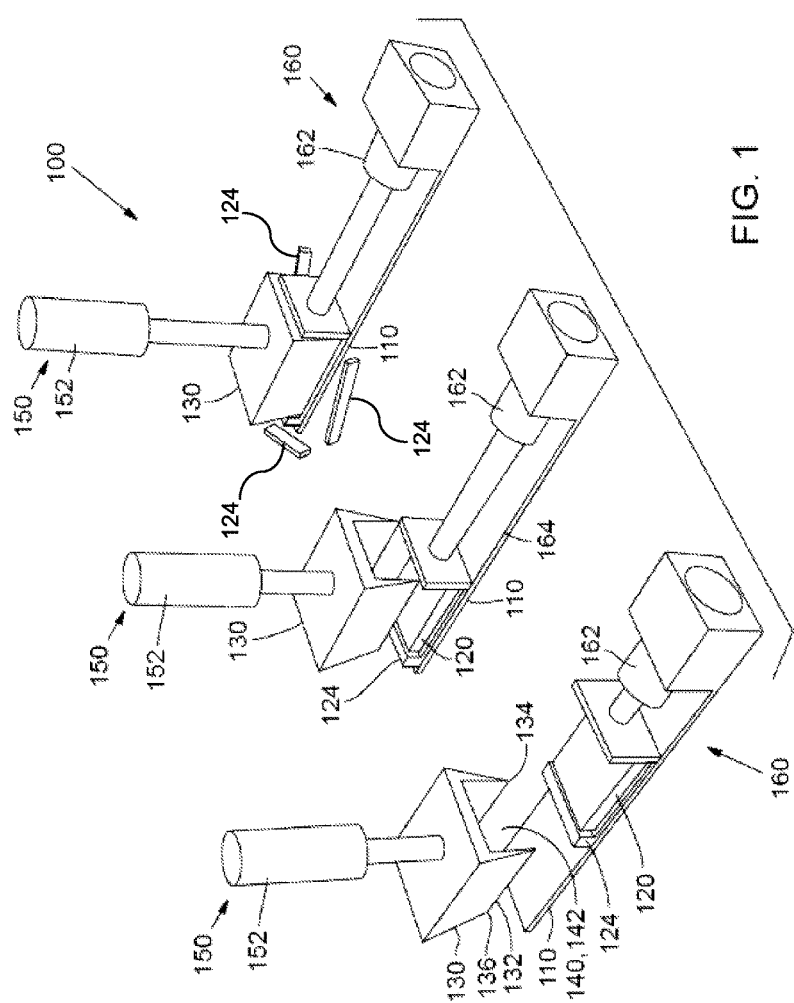

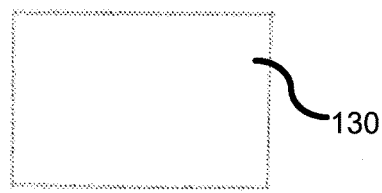
FIG. 2D
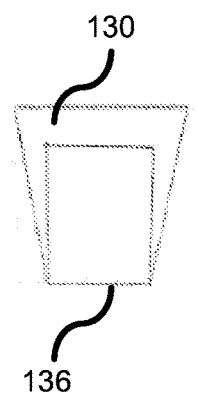
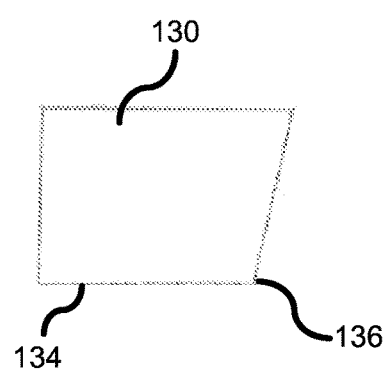
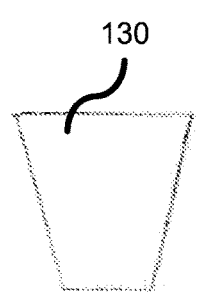
FIG. 2B     FIG. 2A     FIG. 2C
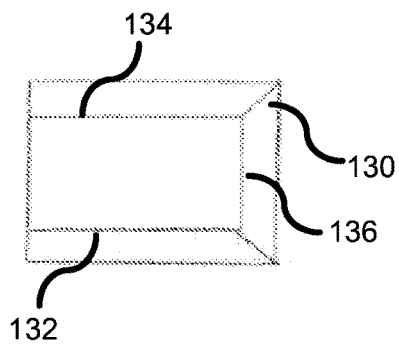
FIG. 2E

HARD DISK DRIVE DESLEDDER

BACKGROUND

Data security is an ongoing problem that requires constant attention to address as technology and efforts to thwart current safeguards continue to change. One aspect of data security is the need to destroy certain components, such as hard disk drives, so data on these drives remains undiscoverable by others. This need may arise because a hard disk drive has failed, because it has served its useful life or purpose or because of some other reason.

In some areas, current best practices and/or rules require that hard disk drives, which are more accurately understood to be "hard disk drive assemblies," are degaussed to neutralize the data contained on the hard disk drive components of these assemblies. In practice, degaussing equipment is sized to receive only the hard disk drive component, which has fairly standard dimensions. But the hard disk component, both as installed for use and when it is removed from service and targeted for destruction, is typically encased in a protective structure. The protective structure often includes features adapting it for easy installation and removal from a computing device, such as a desktop computer, a laptop computer or a server, to name just a few examples. The interior of the protective structure usually must be accessed to remove the hard disk drive component. One protective structure in common use is referred to as a "sled," so the process of removing the sled from the rest of the hard drive assembly is called "desledding," but similar considerations apply to removal of any protective structure, whether it is known as a housing, cage, carriage, enclosure or other term.

Sometimes it is possible remove the hard disk drive component from the rest of the assembly, i.e., the protective structure, by disassembling the assembly, i.e., by loosening one or more fasteners, bending tabs, prying mating pieces apart, etc. These are manual operations, however, and thus they can be time consuming, costly and difficult to carry out safely, especially for a large scale decommissioning operation.

BRIEF DESCRIPTION OF THE DRAWINGS

FIG. 1 is a perspective illustration showing three views of a representative hard disk drive desledder in operation.

FIGS. 2A-2E are side, front, rear, top and bottom views, respectively, of the cutting member of FIG. 1.

DETAILED DESCRIPTION

Described below are representative implementations of a hard disk drive desledder apparatus and related desledding methods. The hard disk drive desledder is a device that uses mechanical advantage to cut away or deform the sled (or other protective outer structure) of a hard disk drive assembly to allow the hard disk drive component within the assembly to be removed for degaussing. The sled or other similar structure is the component of the hard disk drive assembly that adapts it for sliding into and out of a server bay or similar structure.

Figure 3:
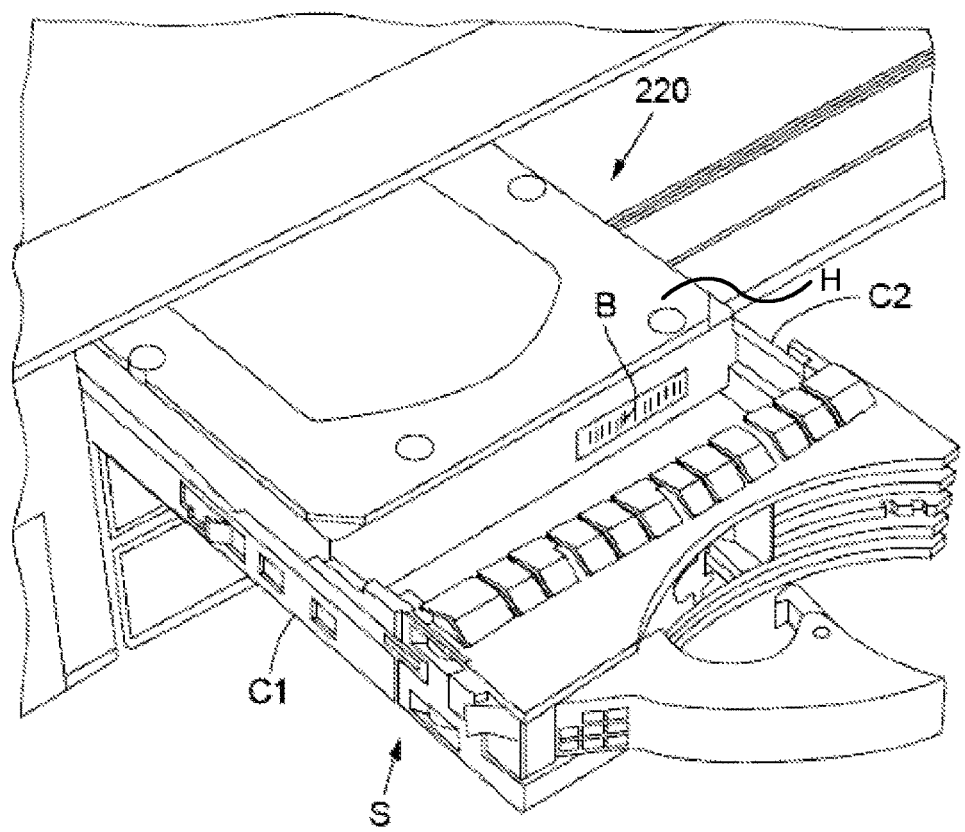
FIG. 3 is an exploded perspective view illustrating a representative hard disk drive assembly as it is being removed from a server, the assembly having an outer sled portion protecting an inner hard disk drive component.

Referring to FIG. 1, a representative hard drive desledder 100 is shown in operation in the three-view sequence of perspective views of FIG. 1. At the left side of the figure, the desledder 100 (also referred to as a dismantler) is shown in an initial phase during which a hard disk drive assembly, shown schematically at 120, is being moved towards the support 110 and into alignment with the cutting member 130 (also referred to as a dismantling member). A more detailed depiction of a hard disk drive assembly 220, which shows its sled S engaged along at least two sides of the hard disk drive component H, is shown in FIG. 3.

Referring again to FIG. 1, the cutting member 130 typically has at least two cutting edges. In the illustrated implementation, there are three cutting edges: (1) a first side cutting edge 132, (2) a second side cutting edge 134 opposite the first side cutting edge 132, and (3) a third end cutting edge 136 that extends between the first side cutting edge 132 and the second side cutting edge 134. The cutting member 130 is shown in more detail in FIGS. 2A-2E. In the illustrated configuration, the cutting edges can be described as forming a U-shaped cutting edge.

The cutting member 130 is designed with a predetermined size and shape to fit over a portion of a typical hard drive assembly (called a "saved" portion) and to cut or dismantle other portion(s) of the assembly. In some cases, the other portion(s) is cut or sheared away from the saved portion. In other cases, the other portion(s) may still be physically connected to the saved portion, but the contents of the saved portion, e.g., the hard disk drive component H within the hard disk drive assembly, can be easily accessed because the metal or other material of the other portions(s) has been deformed (such as by bending, breaking, stretching, etc.).

In one implementation, the cutting member 130 is sized such that its cutting edges cut or dismantle the sled 124 such that the sled 124 is separated from the remainder of the hard disk drive assembly 120 or, even if a portion of the sled 124 remains attached, then an interior of the hard disk drive assembly 120 where the hard drive component H is located is still easy to access. Referring to FIG. 3, if a cutting member having cutting edges spaced apart by a dimension just smaller than the width of the sled S between its sides C1, C2, then the cutting member can be forced past the narrower remainder of the assembly to contact and then cut, shear or otherwise deform at least the sides of the sled S, effectively dismantling it.

Referring again to FIG. 1, the middle view shows the hard disk drive assembly 120 positioned on the support 110 in alignment with the cutting member 130. The right view shows the cutting member after it has been driven in the direction of the support 110. In the illustrated implementation, the cutting member 130 is driven into contact with the support 110, with portions of the sled 124, namely its sides and end, being cut away by contact between the cutting edges 132, 134, 136 and the support 110. In other implementations, the cutting member 130 and support 110 can be dimensioned such that the cutting member 130 is driven past the support 110, instead of into contact with it, to cut or dismantle the sled 124.

As illustrated in FIG. 1, the cutting member 130 can have an open area 140 (or open side) dimensioned to allow a portion of the hard disk drive assembly 120 to protrude from the cutting member. For example, in some implementations, an interface portion of the hard disk drive assembly is allowed to protrude from the cutting member 130 because there may be differences in the size of this area across various brands and models of hard disk drive assemblies that would be difficult to accommodate within the cutting member and cutting other sides of the hard disk drive assembly is sufficient to gain access to the hard disk drive. The precise geometry of the interface has been omitted from FIG. 1 for clarity, but the important point is that the open area 140 can be dimensioned as desired to keep the interface or other area from being contacted by the cutting member 130.

In the implementation of FIG. 1, the cutting member 130 defines a recess sufficient to accommodate at least a portion of the hard disk drive assembly 120, such as, e.g., the saved portion. This prevents the saved portion from being damaged during the desledding process. Although desledding is typically conducted only in conjunction with de-commissioning hard disk drive assemblies, it is often necessary to maintain portions of them in sufficiently good condition so identifying information (such as a barcode B on the hard disk drive component as shown in FIG. 3) can be read and recorded as the assembly or the hard disk drive itself is subjected to further processing, such as degaussing.

In the implementation of FIG. 1, there is a cutting member mover 150, shown schematically, configured to move the cutting member 130, such as from an initial or first position (raised) as shown in the left and center views to a second position (lowered) as shown in the right view. The cutting member mover 150 can include any device or mechanism capable of generating sufficient applied force to drive the cutting member 130 in its cutting or dismantling action, such as an actuator. In one specific implementation, the cutting member mover comprises at least one hydraulic piston 152.

In the implementation of FIG. 1, there is an optional loader 160 for loading hard disk drive assemblies onto the support 110. In the illustrated implementation, the loader 160 includes an actuator 162, which in the left view is shown being moved in translation to push the hard disk drive assembly 120. In the center and right views, the actuator has reached its extended position and the hard disk drive assembly has been pushed along horizontal surface 164 to the support 110, which is in alignment with the cutting member 130. As can be seen, the cutting member 130 and the loader 160 can be operated alternatingly in an automated sequence to achieve a high throughput desledding operation.

The cutting member mover 150 and the actuator 162 can be any suitable moving devices capable of generating sufficient force for the application, including but not limited to hydraulic actuators and electric actuators.

Figure 4:
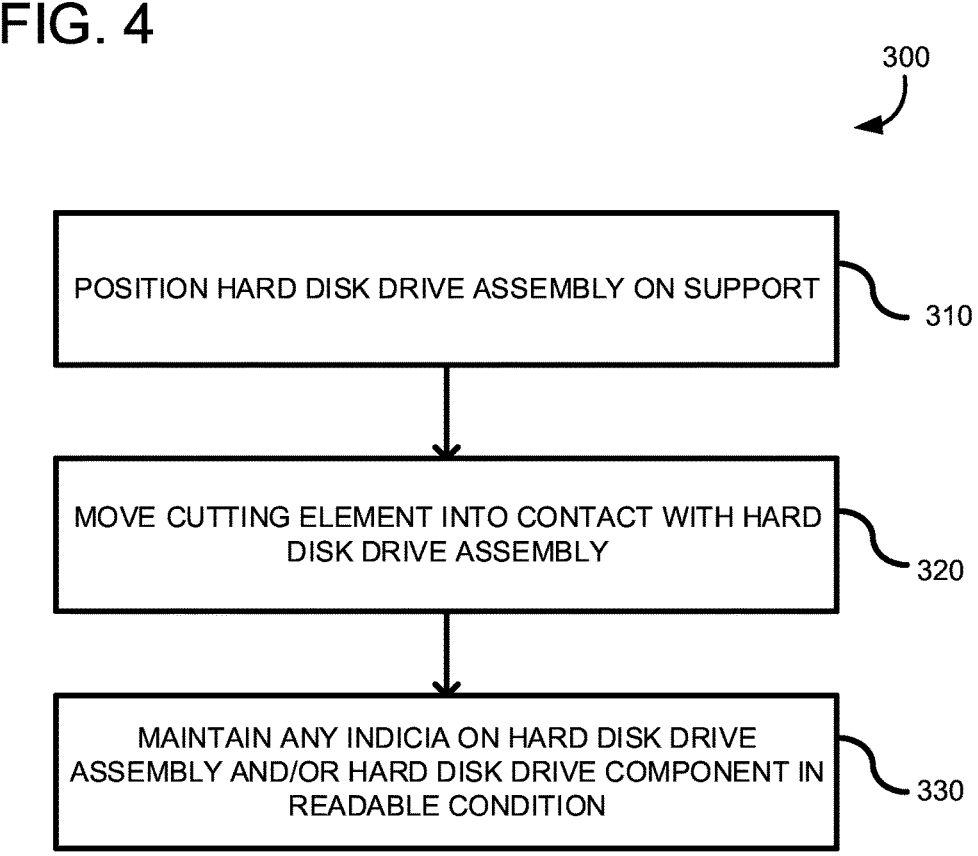
FIG. 4 is a flow chart of a representative method of desledding or otherwise dismantling a hard disk drive assembly.

A flow chart of a representative desledding method 300 is shown in FIG. 4. In a process block 310, the hard disk drive assembly is positioned on a suitable support. The support may be a dedicated support, such as the support 110 described above, or an alternative suitable support, such as a suitable surface against which a cutting element can be urged to cut or dismantle the hard disk drive assembly. In process block 320, the cutting element is moved into contact with the hard disk drive assembly on the support to effect a cutting and/or dismantling operation, such as by deforming or removing at least a part of a protective structure such as a sled to allow access to an interior of the hard disk drive assembly. In process block 330, which is optional, the cutting and/or deforming activity is carried out in a manner that maintains indicia (e.g., bar codes) on the hard drive component and/or other components of the assembly in a readable condition. This optional step is helpful to ensure that hard disk drive assemblies are properly identified and tracked as they undergo the steps of a decommissioning process, which may be semi- or fully automated.

Desirably, the process allows for desledding of a hard disk drive assembly in less than 5 seconds, or even as little as 2-3 seconds in some implementations. According to one implementation, the cutting member is formed of a suitable material (such as a steel) and is designed to have a serviceable life of at least three years and/or 10,000 cycles.

In addition to pushing a cutting member into contact with the hard disk drive assembly, and into contact with an underlying support, or past the support, the desledder can be configured in other ways. For example, the desledder can be configured to have an opening sized according to the portions of the hard disk drive assembly to be separated from each other, and a hydraulic ram or other mechanism can be used to force assemblies through the opening. One or more edges of the opening can be sharpened to assist with cutting and/or dismantling.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the disclosed principles may be applied, it should be recognized that the illustrated embodiments are only preferred examples and should not be taken as limiting the scope of the protection. Rather, the scope of protection is defined by the following claims. We therefore claim all that comes within the scope of these claims.

What is claimed is:
1. A hard disk drive dismantling apparatus, comprising:
a support having a support surface to support a hard disk drive assembly comprising an inner disk drive component and an outer case component, the support surface extending substantially in a first plane and having a first dimension extending longitudinally and a second dimension extending transversely at least as great as corresponding length and width dimensions of the outer case component; and
a dismantling member having a recess defined to at least partially accommodate the length dimension, the width dimension and a depth dimension of the outer case component, the recess having an opening defined substantially in a second plane that extends parallel to the first plane, the opening having at least a pair of opposing edges that extend longitudinally,
wherein the opposing edges are spaced relative to each other to contact the outer case component substantially parallel to the length dimension of the outer case component when the dismantling member is moved toward the support surface in a direction substantially normal thereto, the contact between the dismantling member and the outer case component deforming the outer case component to dismantle the hard disk drive assembly.

2. The hard disk drive dismantling apparatus of claim 1, wherein the pair of opposing edges of the recess comprises a pair of opposite cutting edges.

3. The hard disk drive dismantling apparatus of claim 2, wherein the recess comprises an end cutting edge extending transversely between the pair of opposing edges.

4. The hard disk drive dismantling apparatus of claim 3, wherein the pair of opposite cutting edges and the end cutting edge together define a U-shaped cutting edge within the second plane.

5. The hard disk drive dismantling apparatus of claim 1, wherein one end of the dismantling member comprises an open area extending between the pair of opposite edges and shaped to provide a clearance between the end of the dismantling member and an interface of a hard disk drive assembly received in the support when the opposite edges of the recess contact the outer case component.

6. The hard disk drive dismantling apparatus of claim 1, further comprising a loader configured to contact the hard disk drive assembly and slide the hard disk drive assembly into position on the support surface.

7. The hard disk drive dismantling apparatus of claim 1, further comprising a dismantling member mover configured to drive the dismantling member in translation from a first position in which the dismantling member is spaced away from the support to a second position in which the dismantling member is moved closer to the support.

8. The hard disk drive dismantling apparatus of claim 1, further comprising at least one actuator for moving the dismantling member towards and away from the support.

9. The hard disk drive dismantling apparatus of claim 8, wherein the at least one actuator comprises a hydraulic actuator configured to move and apply force to the dismantling member.

10. The hard disk drive dismantling apparatus of claim 6, wherein the loader and the dismantling member are configured to be used alternatingly in an automated sequence such that the loader pushes a hard disk drive assembly along the support surface while the dismantling member is in a first position spaced away from the support.

11. The hard disk drive dismantling apparatus of claim 10, wherein the loader is moved along a first axis extending longitudinally and the dismantling member is moved along a second axis extending substantially perpendicular to the first axis.

\* \* \* \* \*